US012577927B2

United States Patent
Guo

(12) United States Patent
(10) Patent No.: US 12,577,927 B2
(45) Date of Patent: Mar. 17, 2026

(54) ADJUSTMENT STRUCTURE AND CARBURETOR

(71) Applicant: Wei Guo, Tianshui City (CN)

(72) Inventor: Wei Guo, Tianshui City (CN)

( * ) Notice: Subject to any disclaimer, the term of this patent is extended or adjusted under 35 U.S.C. 154(b) by 376 days.

(21) Appl. No.: 18/227,530

(22) Filed: Jul. 28, 2023

(65) Prior Publication Data

US 2024/0035430 A1 Feb. 1, 2024

(30) Foreign Application Priority Data

Jul. 28, 2022 (CN) ......................... 202210898986.3
May 31, 2023 (CN) ......................... 202321358663.1

(51) Int. Cl.
*F02M 7/18* (2006.01)
*B01F 23/21* (2022.01)

(52) U.S. Cl.
CPC ............... *F02M 7/18* (2013.01); *B01F 23/21* (2022.01)

(58) Field of Classification Search
CPC .................................. F02M 7/18; B01F 23/21
See application file for complete search history.

(56) References Cited

FOREIGN PATENT DOCUMENTS

JP 3702369 B2 * 10/2005

* cited by examiner

*Primary Examiner* — Robert A Hopkins
(74) *Attorney, Agent, or Firm* — Li & Cai Intellectual Property (USA) Office

(57) ABSTRACT

An adjustment structure and carburetor relating to the technical field of carburetors are provided. The adjustment structure includes: a throttle valve, a movable member and a movable member. The throttle valve is provided with an accommodating cavity and a sliding rail arranged in the accommodating cavity. The movable member is arranged in the accommodating cavity and slidably connected to the sliding rail. The rotating member is arranged in the accommodating cavity and threadedly engaged to the movable member, and rotates relative to the movable member and drives the movable member is configured to be driven to slide back and forth along the sliding rail through screws, so as to adjust a height of a jet needle connected with the movable member.

18 Claims, 19 Drawing Sheets

ADJUSTMENT STRUCTURE AND CARBURETOR

FIELD OF THE DISCLOSURE

The present disclosure relates to the technical field of carburetors, in particular, relates to an adjustment structure and a carburetor.

BACKGROUND OF THE DISCLOSURE

As an important member of vehicles such as motorcycles, the carburetor is mainly used to mix and atomize a certain proportion of fuel with air, so that the mixed fuel after atomization can be fully burned. The carburetor can automatically mix the corresponding concentration of mixed gas according to the needs of different working conditions of the engine, and output the corresponding amount of mixed gas for the engine to burn and do work.

In order to make the motorcycle adapt to different altitudes, temperature and humidity and maintain the normal work of the engine, sometimes it is necessary to adjust the height of the jet needle to adjust the fuel output. However, for adjusting the existing jet needle, the entire throttle valve needs to be removed from the carburetor, which is time-consuming and laborious, and the user experience is poor.

SUMMARY OF THE DISCLOSURE

Due to the aforementioned defects, it is necessary to provide an adjustment structure and a carburetor for the problem that the entire throttle valve needs to be disassembled from the carburetor to adjust the height of the jet needle, which is time-consuming and laborious.

The present disclosure provides an adjustment structure, which includes: a throttle valve provided with an accommodating cavity and a sliding rail arranged in the accommodating cavity; a movable member arranged in the accommodating cavity, in which the movable member is slidably connected to the sliding rail; and a rotating member arranged in the accommodating cavity, in which the rotating member is threadedly engaged to the movable member and rotates relative to the movable member, and the movable member is configured to be driven to slide back and forth along the sliding rail through screw threads, so as to adjust a height of a jet needle connected to the movable member.

The above-mentioned adjustment structure can be applied to a carburetor, and an end of the movable member included in the adjustment structure facing away from the rotating member can be connected to the jet needle. When it is necessary to adjust the height of the jet needle, the rotating member can be rotated relative to the movable member, and the movable member is driven to slide back and forth along the sliding rail through the screw threads, thereby adjusting the height of the jet needle. There is no need to disassemble the entire throttle valve from the carburetor, which saves time and effort and provides a good user experience.

The present disclosure further provides a carburetor, which includes a main body, a jet needle and the adjustment structure as described above. The housing is provided with a float chamber, a fuel outlet channel and an airflow channel. The fuel outlet channel correspondingly and spatially communicates with the float chamber and the airflow channel, one end of the jet needle is connected to the movable member, another end of the jet needle is inserted into the fuel outlet channel, and the rotating member rotates relative to the movable member to drive the jet needle to slide relative to the fuel outlet channel to adjust a fuel outlet space of the fuel outlet channel.

In the FIGS., the list of members represented by each reference number is as follows.

100, carburetor;

1, adjustment structure;

11, throttle valve; 111, accommodating cavity; 1111, first cavity; 1112, second cavity; 1113, clamping slot; 1114, sliding slot; 1115, limiting step; 1116, screw hole; 112, engaging slot; 113, first guiding surface; 114, second guiding surface; 115, guiding slot;

12, movable member; 121, flange; 122, first threaded hole;

13, rotating member; 131, second threaded hole; 132, hexagonal driving slot; 133, limiting slot;

14, connecting member; 141, fixing base; 142, first stud; 143, second stud; 15, return member;

2, main body; 21, float chamber; 22, fuel outlet channel; 23, airflow channel; 24, first main body; 25, second main body; 251, first arc surface; 252, second arc surface; 26, mounting channel; 27, air pressure channel; 28, balance hole;

3, jet needle; 31, external thread; 32, oblique notch;

4, adjustment assembly; 41, cover plate; 411, mounting hole; 42, adjustment member; 421, base; 4211, groove; 422, rod body; 423, control cap; 43, elastic member;

5, extension tube;

6, packaging assembly; 61, first connecting member; 611, rotating handle; 612, screw thread; 613, sealing post; 62, second connecting member; 621, first section; 6211, connecting screw hole; 622, second section; 6221, step hole; 6222, annular slot; 6223, annular flange;

7, control member; 71, flow limiting portion; 72, insertion slot; 73, oblique notch; 74, sealing ring; 75, return spring; 76, first adjustment member; 761, second external thread; 762, first return member; 763, first mounting seat; 77, second adjustment member; 771, first external thread; 772, through hole; 773, second mounting seat; 774, mounting slot; 775, second return member; 78, third adjustment member; 781, tenon; 782, mortise; 783, third threaded hole; and 784, anti-slip pattern.

DETAILED DESCRIPTION OF THE EXEMPLARY EMBODIMENTS

The present disclosure will be described in further detail below in conjunction with the accompanying drawings.

The specific embodiment is only an explanation of the present disclosure, and is not a limitation of the present disclosure. After reading the specification, those skilled in the art can make modifications to the embodiment without creation contribution as required, and as long as they are within the scope of the claims of the present disclosure, they are all protected by the patent law.

Figure 1:
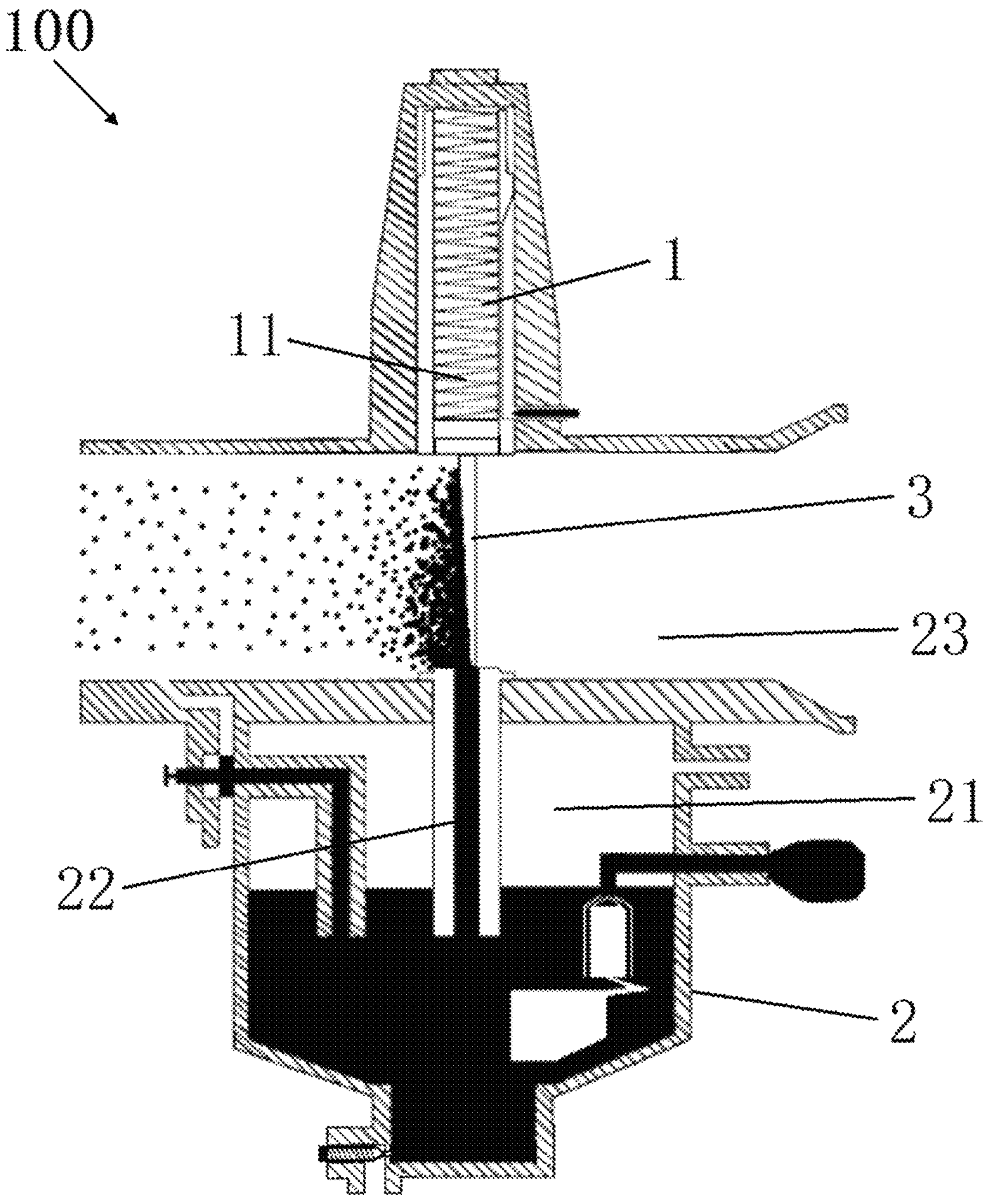
FIG. 1 is a schematic structural diagram of a carburetor of the present disclosure.

Referring to FIG. 1, the present disclosure provides a carburetor 100, and the carburetor 100 is used to mix fuel and air and deliver a mixture of the fuel and air to a combustion chamber of a motor vehicle for combustion to drive an engine to do work, and then the engine drives the motor vehicle to run. The motor vehicle can be a motorcycle, etc.

The carburetor 100 can finely adjust the amount of fuel entering the combustion chamber to maintain the normal work of the engine and provide sufficient power for the motorcycle without using other tools, so that the motorcycle can adapt to various altitudes and temperatures and humidity environment.

Referring to FIG. 1, the carburetor 100 includes an adjustment structure 1, a main body 2 and a jet needle 3. The adjustment structure 1 and the jet needle 3 are arranged in the main body 2, and the jet needle 3 is connected to the adjustment structure 1.

The main body 2 is provided with a float chamber 21, a fuel outlet channel 22 and an airflow channel 23. The fuel outlet channel 22 correspondingly and spatially communicates with the float chamber 21 and the airflow channel 23. The float chamber 21 is used to contain fuel, and the carburetor 100 can generate a negative pressure in the airflow channel 23 when a piston of the engine reciprocates, so that an external air flows into the airflow channel 23 to form an airflow. When the air flow flows through the fuel outlet channel 22, it drives another negative pressure to be formed in the fuel outlet channel 22, and then drives the fuel in the float chamber 21 to flow to the airflow channel 23 through the fuel outlet channel 22, and the fuel mixes with the air flow in the airflow channel 23 to form a fuel mixture. After the fuel mixture enters the combustion chamber and burns, it drives the engine to do work so as to drive the motorcycle to run.

The jet needle 3 is movably inserted in the fuel outlet channel 22. The jet needle 3 is driven by the adjustment structure 1 to slide relative to the fuel outlet channel 22 to adjust a fuel outlet space of the fuel outlet channel 22. When the fuel outlet space of the fuel outlet channel 22 varies, an amount of the fuel delivered from the fuel outlet channel 22 per unit time accordingly varies, and a fuel-air mixing ratio after mixing with the air flow is also different, which results in that the power provided for the motorcycle is also different. In order to make the motorcycle adapt to different environments and different vehicle conditions, it is necessary to use the jet needle 3 to adjust the fuel outlet space of the fuel outlet channel 22, and then adjust the amount of fuel delivered from the fuel outlet channel 22 per unit time, so that the motorcycle can have sufficient power in different environments and under different vehicle conditions.

Figure 2:
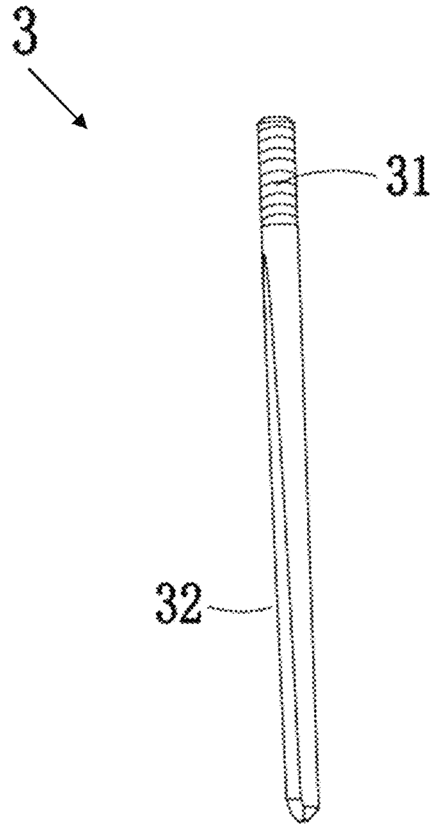
FIG. 2 is a schematic structural diagram of a jet needle of the present disclosure.

Reference is made to FIG. 2, which is a schematic structural diagram of the jet needle 3. An end of the jet needle 3 adjacent to the adjustment structure 1 is defined as a proximal end, and another end of the jet needle 3 far away from the adjustment structure 1 is defined as a distal end. The proximal end of the jet needle 3 has an external thread 31, and the external thread 31 is used for threaded engagement to the adjustment structure 1. Certainly, in other embodiments, the jet needle 3 can also be connected to the adjustment structure 1 in other ways.

The jet needle 3 is provided with an oblique notch 32, and an area of a cross-section of the jet needle 3 gradually increases in a direction from the distal end to the proximal end of the jet needle 3. The cross section is a plane perpendicular to a central axis of the jet needle 3. In a process of withdrawing the jet needle 3 from the fuel outlet channel 22, the proximal end of the jet needle 3 is disengaged from the fuel outlet channel 22, and then the distal end of the jet needle 3 is disengaged from the fuel outlet channel 22. Therefore, when the adjustment structure 1 drives the jet needle 3 to gradually disengage from the fuel outlet channel 22, the fuel outlet space occupied in the fuel outlet channel 22 by the jet needle 3 becomes smaller, so that the fuel outlet space of the fuel outlet channel 22 becomes larger. When the adjustment structure 1 drives the jet needle 3 to gradually insert into the fuel outlet channel 22, the fuel outlet space occupied in the fuel outlet channel 22 by the jet needle 3 becomes larger, so that the fuel outlet space of the fuel outlet channel 22 becomes smaller. The structure of the jet needle 3 can more finely adjust the fuel outlet space of the fuel outlet channel 22, so that the amount of fuel outlet can be adjusted more finely.

The jet needle 3 used in the present disclosure is shorter in length. Compared with the jet needle 3 having a longer length, the jet needle 3 having a shorter length is less affected by internal stress during production and processing, and the jet needle 3 is not easily deformed, thereby ensuring a tightness of the jet needle 3. When the jet needle 3 is fully inserted into the fuel outlet channel 22, it can completely seal the fuel outlet channel 22 to avoid fuel leakage. In addition, when the jet needle 3 slides up and down relative to the fuel outlet channel 22, a stuck phenomenon can be prevented.

Figure 3:
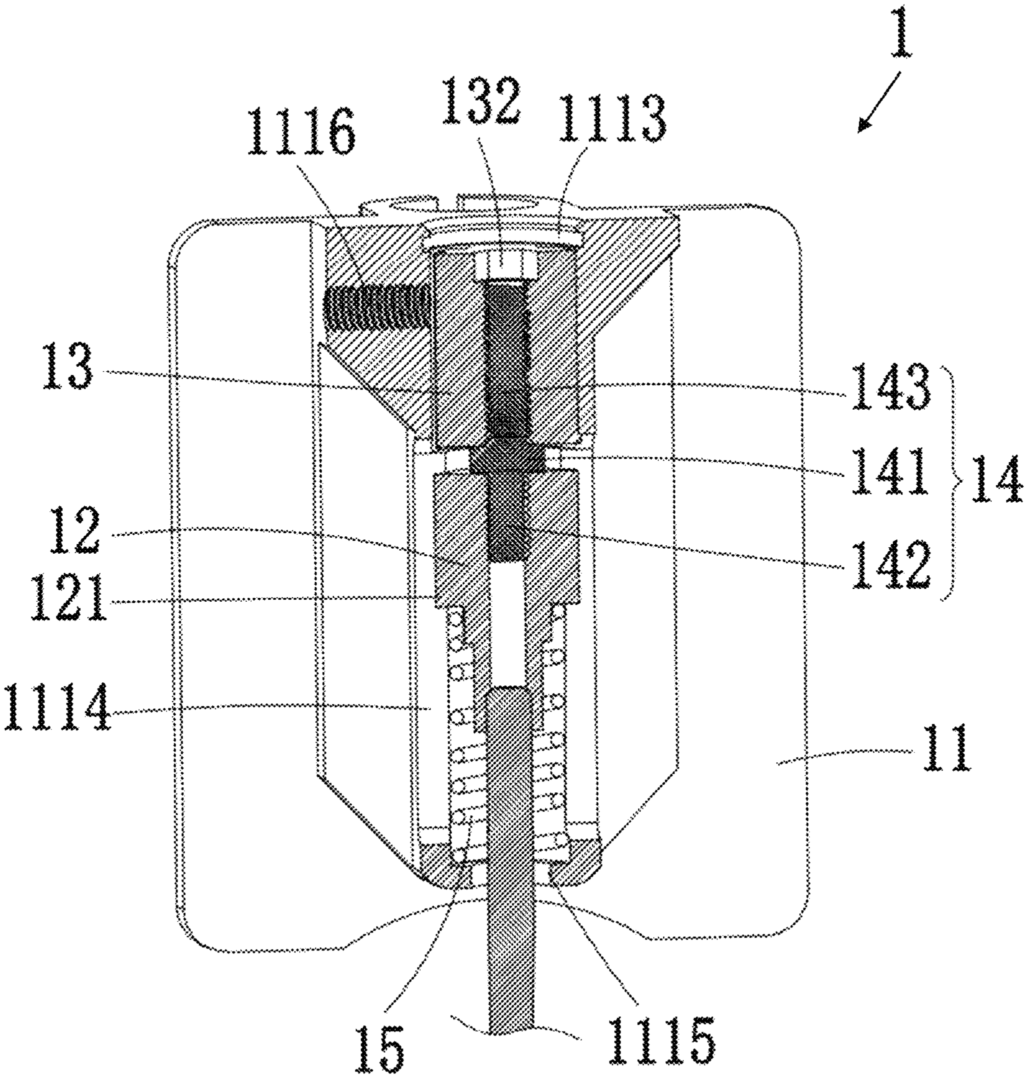
FIG. 3 is a schematic cross-sectional structural diagram of an adjustment structure of the present disclosure.
Figure 4:
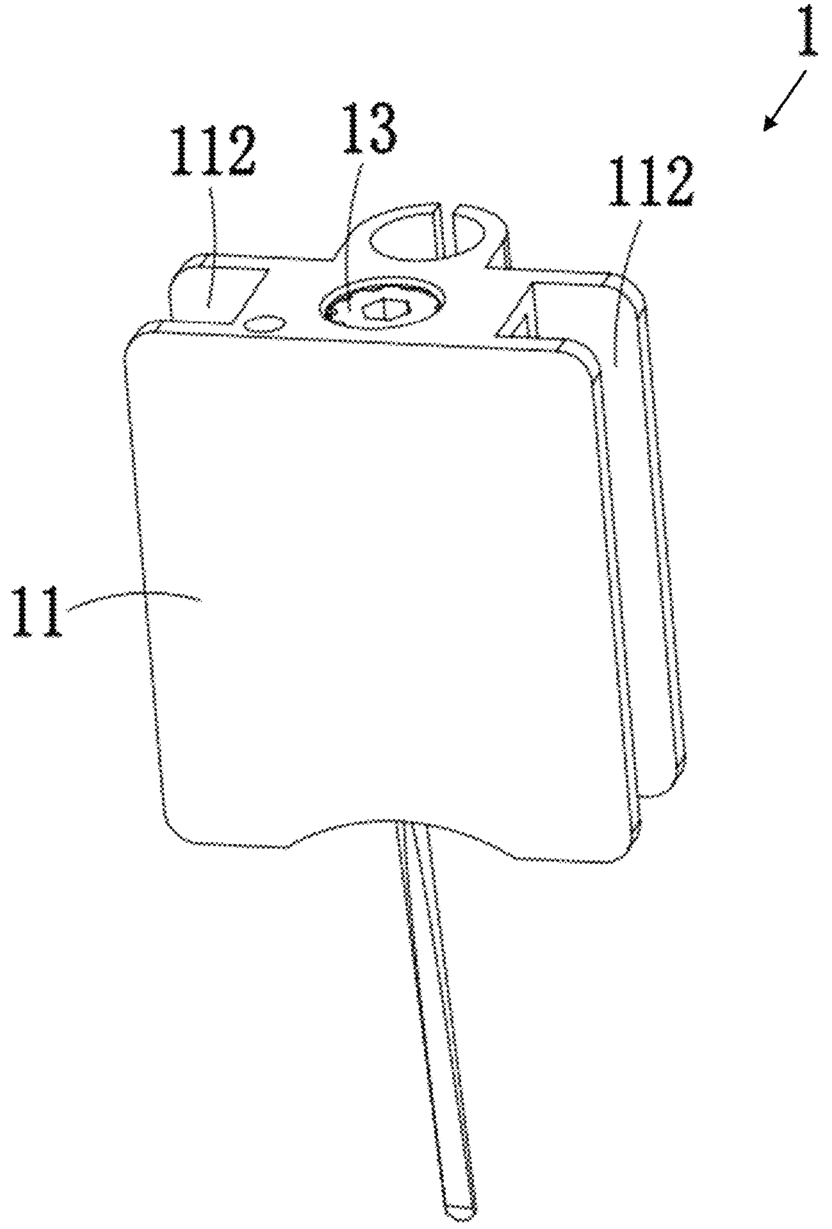
FIG. 4 is a schematic structural diagram of the adjustment structure of the present disclosure.

Referring to FIG. 3 and FIG. 4, the adjustment structure 1 includes a throttle valve 11, a movable member 12, a rotating member 13, a connecting member 14 and a return member 15. The movable member 12, the rotating member 13 and the connecting member 14 are all arranged in the throttle valve 11, and two ends of the connecting member 14 are respectively threadedly engaged to the movable member 12 and the rotating member 13.

Figure 5:
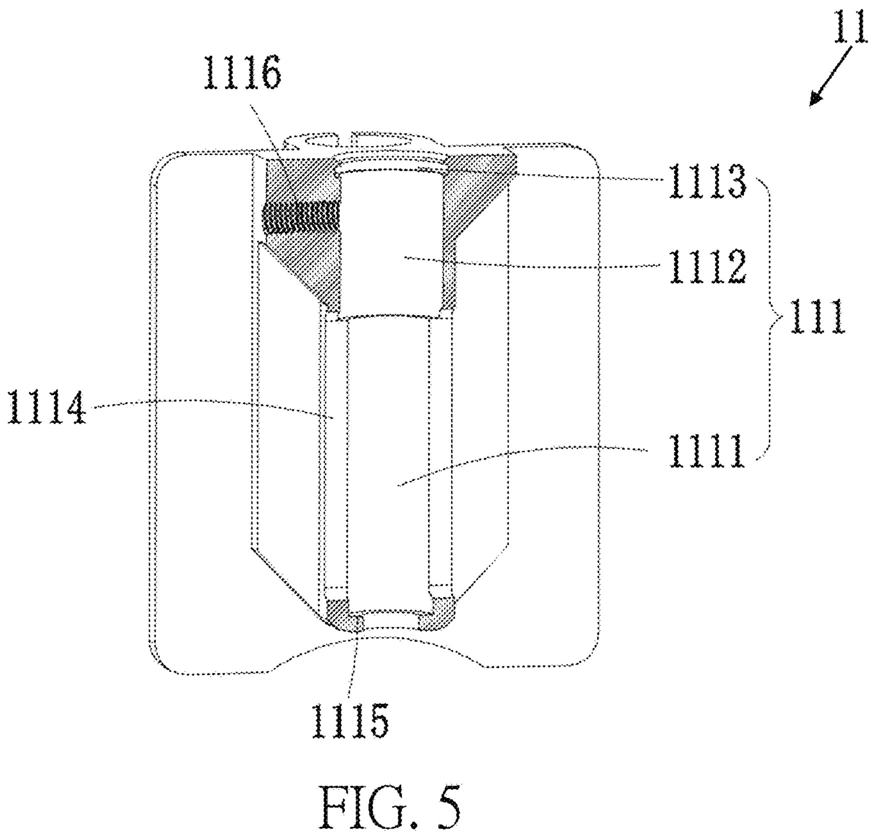
FIG. 5 is a schematic cross-sectional structural diagram of a throttle valve of the present disclosure.

Referring to FIG. 5, the throttle valve 11 is provided with an accommodating cavity 111 for accommodating the movable member 12 and the rotating member 13. The accommodating cavity 111 includes a first cavity 1111, a second cavity 1112 and a clamping slot 1113 that spatially communicate with each other in sequence, and a diameter of the first cavity 1111 is smaller than a diameter of the second cavity 1112. The first cavity 1111 is used for mounting of the movable member 12, and the second cavity 1112 is used for mounting of the rotating member 13. A radial dimension of the rotating member 13 is larger than the diameter of the first cavity 1111, so that the rotating member 13 can always stay in the second cavity 1112.

The clamping slot 1113 is used for mounting a spring, and the spring can limit the rotating member 13 arranged in the second cavity 1112 to prevent the rotating member 13 from disengaging from the second cavity 1112.

Figure 6:
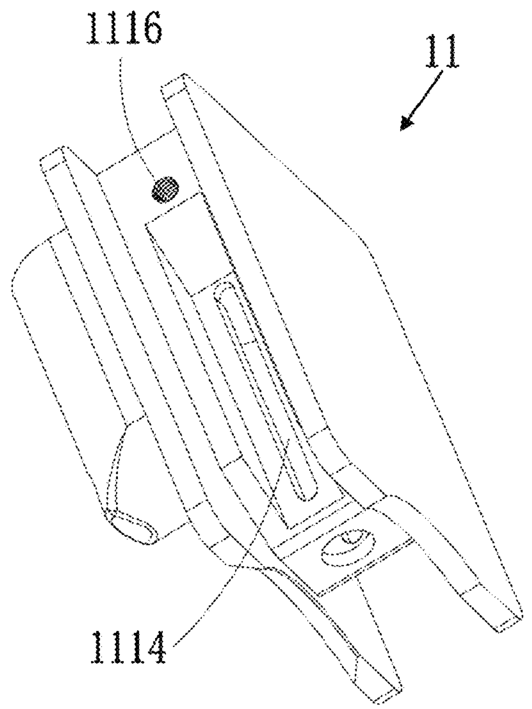
FIG. 6 is a schematic structural diagram of the throttle valve of the present disclosure.

Referring to FIG. 5 and FIG. 6, a cavity wall of the first cavity 1111 is correspondingly provided with two sliding slots 1114, and the two sliding slots 1114 are arranged opposite to each other to form a sliding rail for the movable member 12 to slide up and down. Certainly, in other embodiments, a number of the sliding slots 1114 can also be other numbers, such as one or three or more than three, which is not limited herein.

A limiting step 1115 is further provided in the accommodating cavity 111, and the limiting step 1115 is used to limit a position of the return member 15, and in addition, the limiting step 1115 is provided with an open through which the jet needle 3 passes.

The throttle valve 11 is further provided with a screw hole 1116, and a limiting screw can pass through the screw hole 1116, so that the limiting screw can limit a position of the rotating member 13 arranged in the second cavity 1112. The limiting screw may be a Pozi screw commonly used in the field.

Referring to FIG. 1 and FIG. 4, each of two sides of the throttle valve 11 is provided with an engaging slot 112, and the engaging slots 112 can be correspondingly engaged to the main body 2, so that the throttle valve 11 can slide relative to the main body 2, thereby adjusting a blocking area of the throttle valve 11 in the airflow channel 23.

Referring to FIG. 3, the connecting member 14 includes a fixing base 141, a first stud 142, and a second stud 143 that are integrally formed. The first stud 142 and the second stud 143 are arranged on opposite sides of the fixing base 141. The first stud 142 is used for being threadedly engaged to the movable member 12, and the second stud 143 is used for being threadedly engaged to the rotating member 13.

Referring to FIG. 3, two sides of the movable member 12 are respectively provided with two flanges 121, and the two flanges 121 are respectively engaged to the two sliding slots 1114, so that the movable member 12 can slide back and forth in the first cavity 1111.

The movable member 12 is penetrated with a first threaded hole 122, and the first threaded hole 122 is threadedly engaged to the first stud 142. In addition, an end of the first threaded hole 122 facing away from the first stud 142 is threadedly engaged to the jet needle 3.

Figure 7:
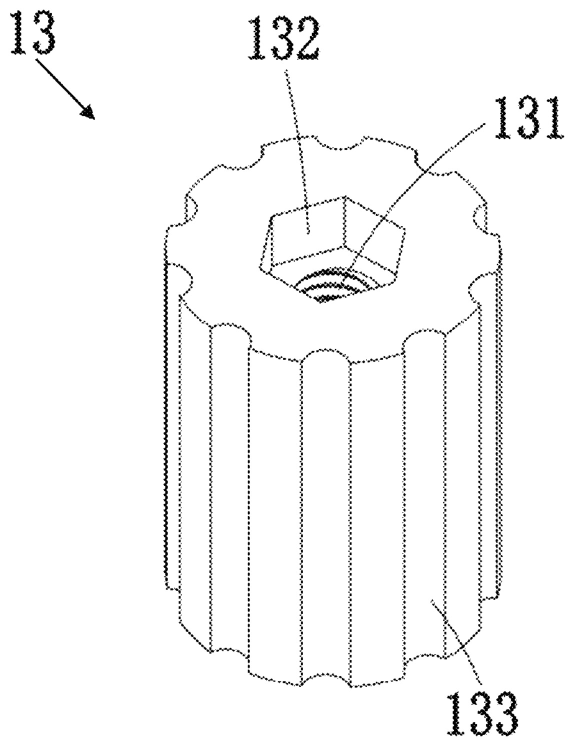
FIG. 7 is a schematic structural diagram of a rotating member of the present disclosure.

Referring to FIG. 3 and FIG. 7, the rotating member 13 is penetrated with a second threaded hole 131, and the second threaded hole 131 is threadedly engaged to the second stud 143. In addition, a hexagonal driving slot 132 is provided on a side of the rotating member 13 facing away from the movable member 12, and the hexagonal driving slot 132 can be engaged to a hexagonal wrench, so that the hexagonal wrench drives the rotating member 13 to rotate, which is convenient to operate. Certainly, in other embodiments, the hexagonal driving slot 132 can also be replaced by other structural slots, such as non-circular slots or irregular slots such as slots, cross slots, triangular slots, and flat slots, which is not limited herein.

A circumferential side wall of the rotating member 13 is provided with a plurality of limiting slots 133, and each of the plurality of limiting slots 133 can be engaged to a limiting screw for damping, so that the limiting screw limits the rotation of the rotating member 13 relative to the movable member 12 to prevent the rotating member 13 from rotating accidentally. When the rotating member 13 needs to be rotated, a greater force can be applied to the rotating member 13 to overcome a resistance of the limiting screw applied to the rotating member 13 to drive the rotating member 13 to rotate relative to the movable member 12.

The rotating member 13 can be made of a metal material or a high-strength plastic material, so that when the limiting screw is switched and engaged to different one of the plurality of limiting slots 133 of the rotating member 13, there will be an obvious click sound between the limiting screw and the rotating member 13. When a user drives the rotating member 13 to rotate, the user can listen to the sound in real time. One sound means that the rotating member 13 rotates by a unit angle, and the unit angle is an angle formed between two adjacent limiting slots 133. It should be noted that the plurality of limiting slots 133 provided on the rotating member 13 are distributed at an equal angle, which is convenient for the user to finely adjust the rotating member 13. A number of the plurality of limiting slots 133 in the embodiment shown in FIG. 7 is ten, so the unit angle is 36°. During the rotation of the rotating member 13, when the user hears one sound, it means that the rotating member 13 has been rotated by 36°. Certainly, in other embodiments, the number of the limiting slots 133 can also be other numbers, such as twelve, which is not limited herein.

The adjustment structure 1 further includes a return member 15. The return member 15 in the embodiment shown in FIG. 3 is a return spring, and the return spring is sleeved on an outer wall of the movable member 12. One end of the return spring abuts against the limiting step 1115, and another end of the return spring abuts against the movable member 12. When the rotating member 13 rotates relative to the movable member 12 and drives the movable member 12 to slide against the rotating member 13, the movable member 12 presses against the return spring, driving the return spring to accumulate elastic force. The return spring can also release the elastic force to press against the movable member 12, so that the movable member 12 and the rotating member 13 are maintained in a tightly-engaged state.

When it is necessary to reduce the fuel injection concentration of the carburetor, the rotating member 13 can be controlled to rotate in the opposite direction, the rotating member 13 drives the movable member 12 to slide against the rotating member 13 through threaded cooperation, and the movable member 12 drives the jet needle 3 to gradually insert into the fuel outlet channel 22, so as to reduce the fuel outlet area of the fuel outlet channel 22.

When it is necessary to increase the fuel injection concentration of the carburetor, the rotating member 13 can be controlled to rotate in the forward direction, and the rotating member 13 drives the movable member 12 to slide toward the rotating member 13 through threaded cooperation, and the movable member 12 drives the jet needle 3 to gradually move away from the fuel outlet channel 22, so as to increase the fuel outlet area of the fuel outlet channel 22.

Figure 8:
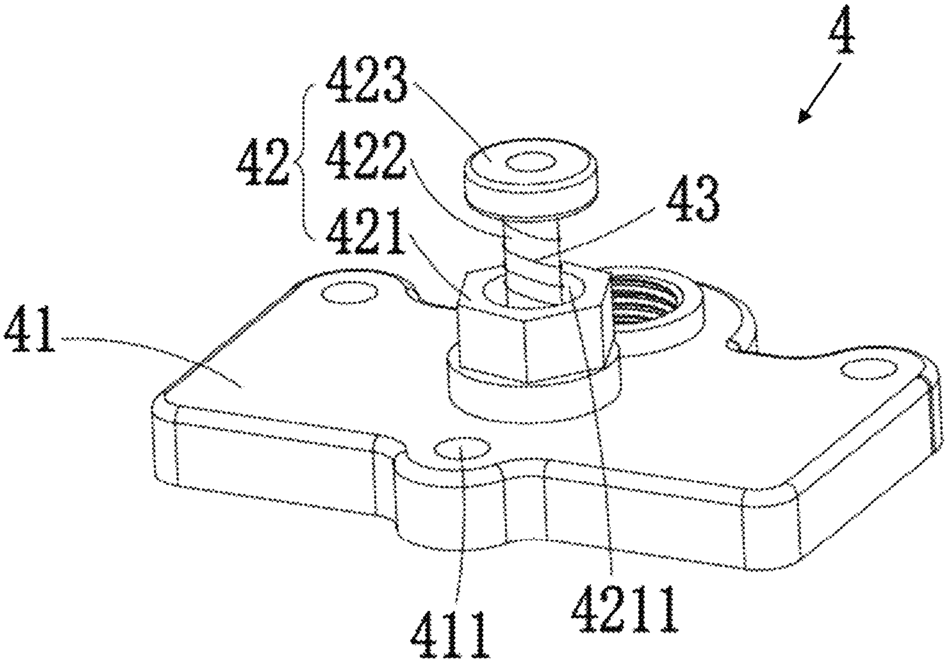
FIG. 8 is a schematic structural diagram of the adjustment assembly when viewed at an angle of the present disclosure.
Figure 9:
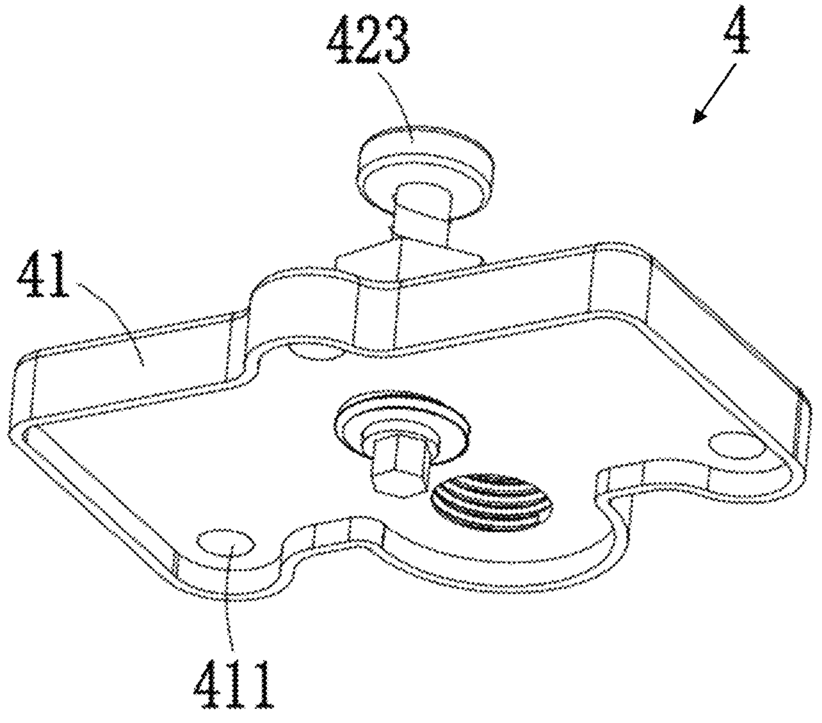
FIG. 9 is a schematic structural diagram of the adjustment assembly when viewed at another angle of the present disclosure.

Referring to FIG. 8 and FIG. 9, the carburetor 100 further includes an adjustment assembly 4, and the adjustment assembly 4 is used to control the rotation of the rotating member 13, so that the rotating member 13 is controlled to drive the movable member 12 to slide back and forth.

The adjustment assembly 4 includes a cover plate 41, an adjustment member 42 and an elastic member 43. The adjustment member 42 is slidably and rotatably connected to the cover plate 41, and can rotate and slide relative to the cover plate 41. The elastic member 43 is sleeved on the adjustment member 42, and two ends of the elastic member 43 respectively abut against the cover plate 41 and the adjustment member 42.

The cover plate 41 is provided with a plurality of mounting holes 411, and the plurality of mounting holes 411 can be used for screw penetration, so that the screws are threadedly engaged to the main body 2, so as to fix the adjustment assembly 4 on the main body 2, thereby facilitating the adjustment member 42 to control the rotation of the rotating member 13.

The adjustment member 42 includes a base 421, a rod body 422 and a control cap 423. Two ends of the rod body 422 are respectively connected to the base 421 and the control cap 423. An end of the rod body 422 adjacent to the base 421 passes through the cover plate 41, and the end is a regular hexagonal prism, which is used for engaging to the hexagonal driving slot of the rotating member 13. The user can push the control cap 423, and the control cap 423 drives the rod body 422 to move toward the rotating member 13, so that the end of the rod body 422 is fittingly engaged to the hexagonal driving slot of the rotating member 13, and then the user can rotate the control cap 423 to drive the rotating member 13 to rotate.

When the control cap 423 slides toward the rotating member 13, the control cap 423 presses against the elastic member 43 to drive an elastic force to be accumulated in the elastic member 43. When it is not necessary to drive the rotating member 13 to rotate, the elastic member 43 drives the control cap 423 and the rod body 422 to move away from the rotating member 13, so that the rod body 422 is disengaged from the hexagonal driving slot of the rotating member 13 for safety purpose.

The base 421 is provided with a groove, the elastic member 43 abuts against a bottom of the groove, and the groove can limit a position of the elastic member 43.

When the fuel outlet space of the fuel outlet channel 22 of the present disclosure is adjusted, it only needs to manually adjust the control cap 423 and the height of the jet needle, and it is not necessary to disengage the entire throttle valve from the carburetor, which saves time and effort and provides a good user experience.

Figure 10:
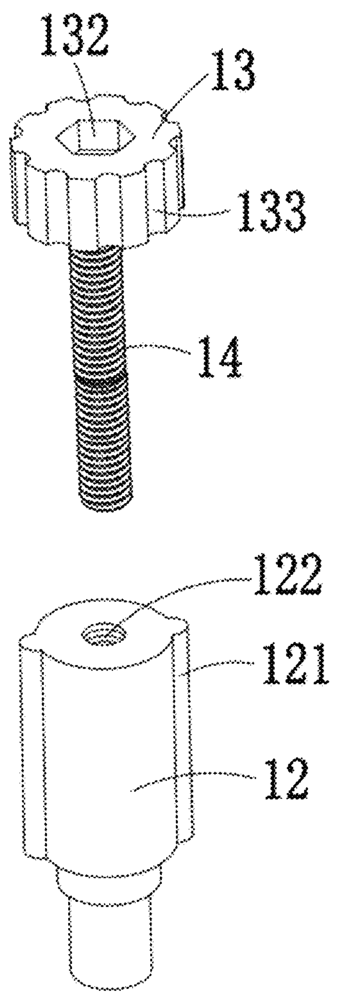
FIG. 10 is a schematic structural diagram showing connection between the rotating member and the movable member according to another embodiment of the present disclosure.

Referring to FIG. 10, in an alternative embodiment, the connecting member 14 can be replaced with a longer screw rod, and the screw rod and the rotating member 13 are integrally formed. A thickness of the rotating member 13 can be reduced, a thickness of the movable member 12 can be increased, and the screw rod is threadedly engaged to the first threaded hole 122 of the movable member 12. When the adjustment assembly 4 drives the rotating member 13 to rotate, the rotating member 13 drives the screw rod to rotate, and the screw rod is threaded to drive the movable member 12 to slide up and down, so that the height of the jet needle 3 can also be adjusted. Compared with the above-mentioned embodiments, the present embodiment provides a simpler structure that is more convenient to use.

Figure 11:
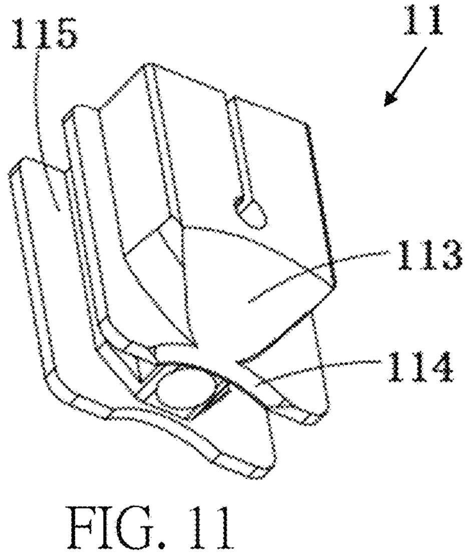
FIG. 11 is a schematic structural diagram of the throttle valve according to another embodiment of the present disclosure.

Referring to FIG. 11, in a feasible embodiment, the throttle valve 11 is provided with a first guiding surface 113 and a second guiding surface 114. The first guiding surface 113 and the second guiding surface 114 are connected and transitioned to each other.

The first guiding surface 113 is an arc surface, and an arc of the arc surface is not limited. For example, it can be one radian to two radians. The arc of the first guiding surface 113 in the embodiment shown in FIG. 11 is one radian. Certainly, other radians may also be used, which is not limited herein.

In an air intake direction of the airflow channel 23, the first guiding surface 113 and an axial direction of the airflow channel 23 have an included angle therebetween, and the included angle is 60°. Certainly, the included angle can also be other angles, such as 45°, 70°, etc., which is not limited herein. In addition, a radial dimension of the first guiding surface 113 decreases gradually, so that the air flow passing through the first guiding surface 113 will not form strong air turbulence through a guiding effect of the first guiding surface 113. The radial dimension of the first guiding surface 113 is a distance between the first guiding surface 113 and the central axis of the airflow channel 23. Furthermore, in the air intake direction of the airflow channel 23, an area of the first guiding surface 113 decreases gradually, such that it is more beneficial for alleviating an air turbulence.

Referring to FIG. 11, the second guiding surface 114 is connected to an end of the first guiding surface 113 having a smallest radial dimension, and the second guiding surface 114 is another arc surface. An arc of the another arc surface is not limited. For example, it can be one radian to two radians. The radian of the second guiding surface 114 in the embodiment shown in FIG. 11 is 1.2 radians. Certainly, other radians may also be used, which is not limited herein.

In addition, in the air intake direction of the airflow channel 23, a radial dimension of the second guiding surface 114 decreases gradually.

The air flow entering the airflow channel 23 flows through the first guiding surface 113 and the second guiding surface 114 in sequence. Because in the air intake direction of the airflow channel 23, the radial dimension of the first guiding surface 113 and the radial dimension of the second guiding surface 114 are both decreasing, so the air flow can pass through the first guiding surface 113 and the second guiding surface 114 smoothly, so that an influence of the throttle valve 11 on the air flow can be minimized, and a flow velocity of the air flow through the fuel outlet channel 22 is relatively increased, which can form a relatively large negative pressure on the fuel outlet channel 22 and drive more fuel to be ejected from the fuel outlet channel 22, and the mixture mixed with the air flow contains more fuel. After the mixture flows into the combustion chamber and burns, a stronger power for the engine can be provided.

Referring to FIG. 11, each of two sides of the throttle valve 11 is provided with a guiding slot 115, and the guiding slots 115 are used for sliding connection with the main body 11, so that the throttle valve 11 can slide up and down relative to the main body 2 to adjust an unobstructed area of the airflow channel 23. The larger the unobstructed area is, the larger the air flow volume of the airflow channel 23 is, and vice versa. In a preferred state, the first guiding surface 113 of the throttle valve 11 is just completely positioned at the airflow channel 23. At this moment, a vertical side wall of the throttle valve 11 is not located in the airflow channel 23, the air flow flowing in the airflow channel 23 will basically not form the air turbulence on the throttle valve 11, the flow velocity of the air flow flowing through the fuel outlet channel 22 is greater, the power of sucking fuel is more sufficient, and more fuel can be sucked and mixed with the air flow, so that more sufficient power can be provided to the engine after combustion.

Figure 12:
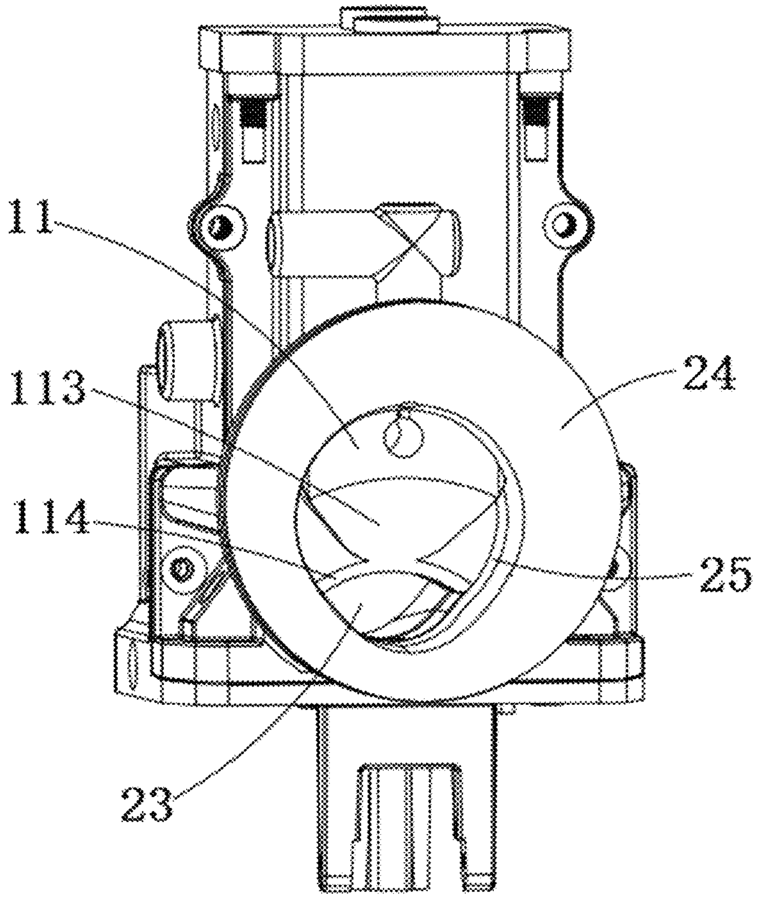
FIG. 12 is a schematic structural diagram of the carburetor according to yet another embodiment of the present disclosure.

Referring to FIG. 12, an air intake portion of the main body 2 includes a first main body 24 and a second main body 25 that are connected with each other, and the first main body 24 and the second main body 25 are integrally formed. In the air intake direction of the airflow channel 23, a radial dimension of the first main body 24 decreases gradually, and a shape is similar to a trumpet mouth.

Figure 13:
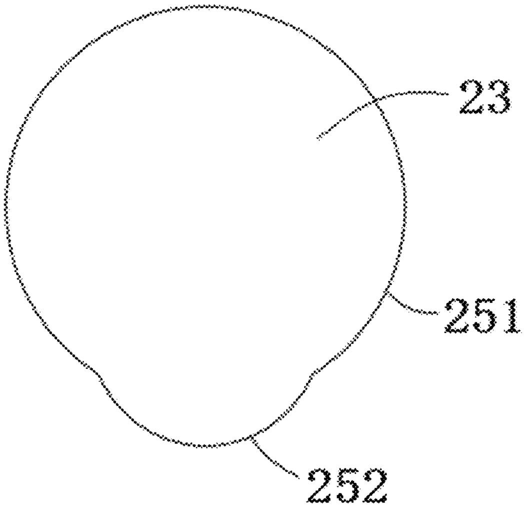
FIG. 13 is a schematic structural diagram of a contour of a second airflow channel of the present disclosure.

Reference is made to FIG. 13, in which FIG. 13 shows a schematic contour of a corresponding channel of the second main body 25. An inner wall of the second main body 25 includes a first arc surface 251 and a second arc surface 252, and a diameter of the second arc surface 252 is smaller than a diameter of the first arc surface 251. In a process of gradually unblocking the airflow channel 23, the throttle valve 11 passes through the second arc surface 252 having the smaller diameter, and then passes through the first arc surface 251 having the larger diameter. When the engine is in a low-speed state, the throttle valve 11 passes through the second arc surface 252, the unobstructed area of the airflow channel 23 does not change very much, and a reduction of the negative pressure of the airflow channel 23 will not be very fast. A pressure difference at the air inlet of the airflow channel 23 is relatively large, so that a flow rate of the air flow entering the airflow channel 23 is relatively high, resulting in that the atomization effect on the fuel is better, the fuel can be fully burned, and the exhaust gas emitted by the fuel after combustion is less, which is conducive to environmental protection and can provide sufficient power for the engine even at low engine speeds.

Figure 14:
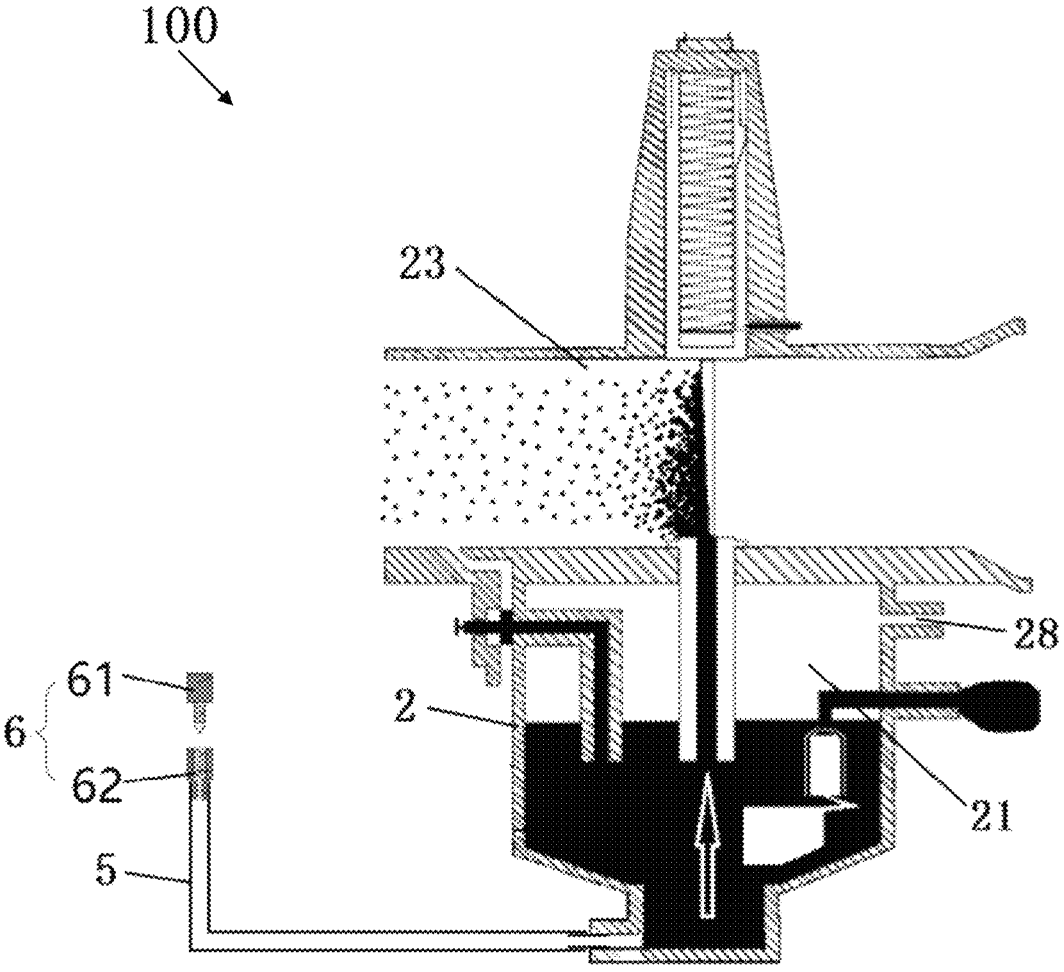
FIG. 14 is a schematic structural diagram of the carburetor according to another embodiment of the present disclosure.

Referring to FIG. 14, the carburetor 100 further includes an extension tube 5 and a packaging assembly 6. One end of the extension tube 5 is connected to the main body 2, the extension tube 5 spatially communicates with the float chamber 21, and another end of the extension tube 5 is connected to the packaging assembly 6.

The packaging assembly 6 can be switched between a closed state and an open state. When the packaging assembly 6 is in the closed state, the fuel in the float chamber 21 cannot flow to an outside. When the packaging assembly 6 is in the open state, the fuel in the float chamber 21 can flow to the outside through the extension tube 5 and the packaging assembly 6. After the motorcycle rides through water, it is easy to cause water to enter the carburetor structure 100, and in severe cases, the fuel cannot be fully burned. Therefore, it is necessary to switch the packaging assembly 6 to the open state to discharge the fuel with water to the outside, so that the fuel can be fully burned to drive the engine to work normally.

The packaging assembly 6 includes a first connecting member 61 and a second connecting member 62. The second connecting member 62 is connected to the another end of the extension tube 5 away from the float chamber 21. The first connecting member 61 can move relative to the second connecting member 62, so that the packaging assembly 1 can be switched between the closed state and the open state.

Figure 15:
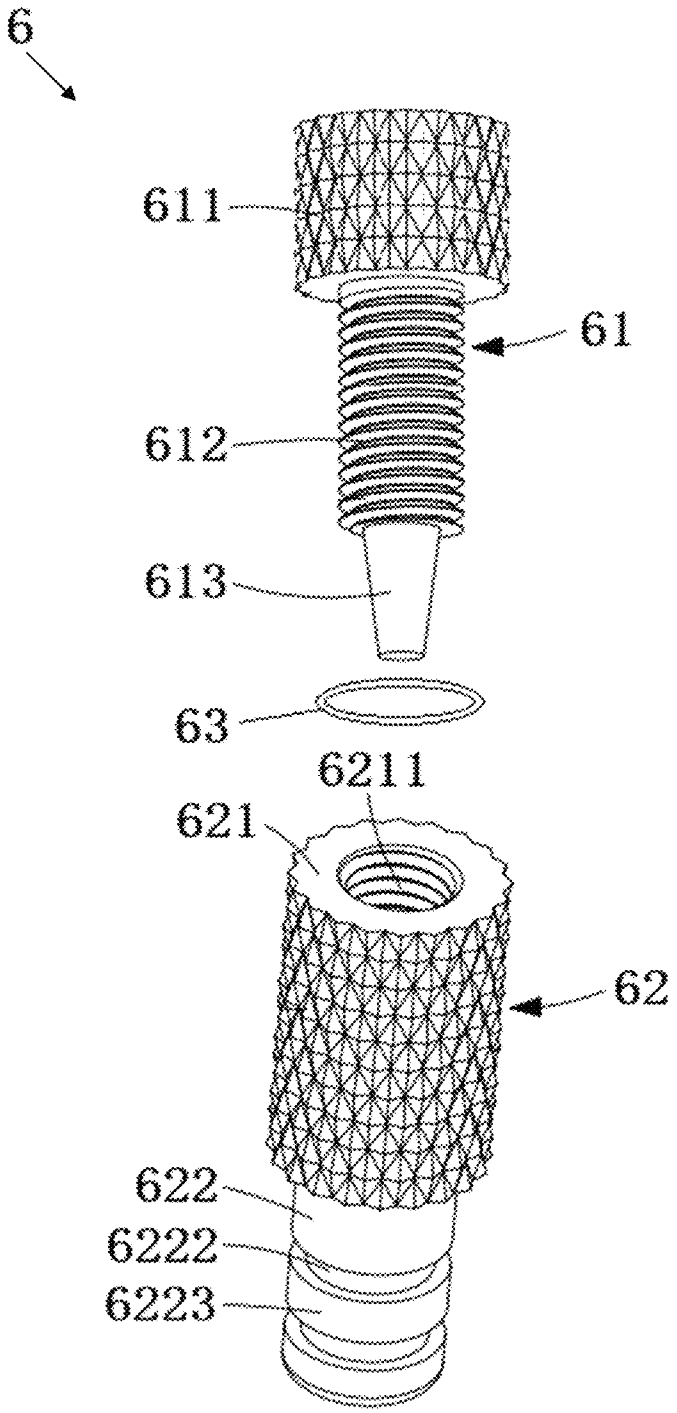
FIG. 15 is a schematic structural diagram of a packaging assembly of the present disclosure.

There are certain ways to movably connect the first connecting member 61 and the second connecting member 62, such as threaded connection, buckle connection and the like. Referring to FIG. 15, the first connecting member 61 and the second connecting member 62 are threadedly engaged to each other, so that the first connecting member 61 and the second connecting member 62 can be tightly connected or detached. When the first connecting member 61 and the second connecting member 62 are disassembled and separated, the packaging assembly 1 is in the open state, and the fuel can be discharged to the outside through the extension tube 5 and the second connecting member 62. When the first connecting member 61 and the second connecting member 62 are sealed and connected, the packaging assembly 6 is in the closed state, and the first connecting member 61 blocks the second connecting member 62 to prevent fuel from being discharged to the outside through the second connecting member 62.

The first connecting member 61 includes a rotating handle 611, a screw thread 612 and a sealing post 613 that are integrally formed. The screw thread 612 is arranged between the rotating handle 611 and the sealing post 613. The user can manually rotate the rotating handle 611 to drive the screw thread 612 to be threadedly connected to the second connecting member 62, so that the sealing post 613 seals the second connecting member 62.

The sealing post 613 is tapered, and a diameter of the sealing post 613 decreases gradually along a direction from the rotating handle 611 to the screw thread 612, so as to allow the sealing post 613 to seal the second connecting member 62.

Figure 16:
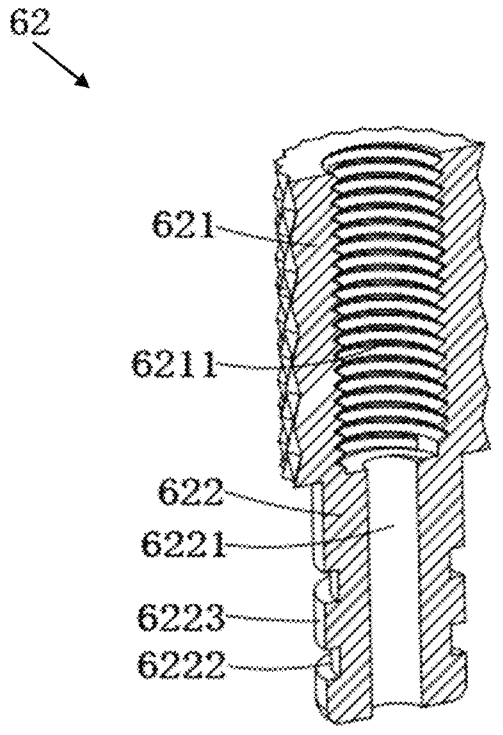
FIG. 16 is a schematic cross-sectional diagram of a second connecting member of the present disclosure.

Referring to FIG. 16, the second connecting member 62 includes a first section 621 and a second section 622. The first section 621 and the second section 622 are integrally formed. A connecting screw hole 6211 is provided in the first section 621, and the connecting screw hole 6211 is used for threaded engagement with the first connecting member 61, so that the first connecting member 61 and the second connecting member 62 can be threadedly engaged to each other or detached.

The second section 622 is used for connecting the extension tube 5, and an outer diameter of the second section 622 is smaller than an outer diameter of the first section 621 so as to limit the extension tube 5. A step hole 6221 is provided in the second section 622, and a diameter of the step hole 6221 is smaller than a diameter of the connecting screw hole 6211. The step hole 6221 can be blocked or unblocked by the sealing post 613 of the first connecting member 61. When the sealing post 613 blocks and seals the step hole 6221, the fuel cannot flow out of the second connecting member 62. When the first connecting member 61 is separated from the second connecting member 62 and the sealing post 613 does not block the step hole 1121, the fuel can flow to the outside from the second connecting member 62.

An outer wall of the second section 622 is provided with a plurality of annular grooves 6222 that are spaced with each other, so that the second section 622 has a plurality of annular flanges 6223 formed thereon. The extension tube 5 is sleeved on the second section 622 and abuts against the annular flanges 6223 so as to make the connection between the extension tube 5 and the second section 622 stable and not easy to fall off. Certainly, in order to make the connection between the extension tube 5 and the second section 622 more stable, an iron wire can even be tied outside the extension tube 5.

The packaging assembly 6 further includes a sealing ring 63, and the sealing ring 63 is sleeved on the first connecting member 61. When the first connecting member 61 and the second connecting member 62 are screwed together, the first connecting member 61 and the second connecting member 62 can press against the sealing ring 63 to further improve the sealing between the first connecting member 61 and the second connecting member 62, so as to prevent accidental outflow of fuel.

The extension tube 5 can be made of a plurality of bent hard metal tubes, or it can be a soft material hose. The extension tube 5 of the embodiment shown in FIG. 14 is a plastic hose, and the plastic hose can be easily deformed to adjust the position of the fuel outlet to facilitate the discharge of fuel. Even if there are various complex parts blocking near the junction of the extension tube and the main body 2, the extension tube 5 can shuttle freely to adjust the position of the fuel outlet to a suitable position to discharge the fuel. A length of the extension tube 5 is not limited. Even if the other structures of the carburetor 100 are complicated, the another end of the extension tube 5 away from the float chamber 21 can be passed out to a convenient position for operation.

Referring to FIG. 14, the main body 2 is provided with a balance hole 28, and the balance hole 28 correspondingly and spatially communicates with the float chamber 21 and the outside of the main body 2, so that the float chamber 21 communicates with the atmosphere outside the main body 2. When the airflow channel 23 has the air flow passing through the fuel outlet channel 22, the air flow forms a negative pressure on the fuel outlet channel 22. The float chamber 21 communicates with the atmosphere, so it will not affect the flow of fuel in the float chamber 21 into the fuel outlet channel 22, and the fuel can smoothly flow to the airflow channel 23 through the fuel outlet channel 22.

Figure 17:
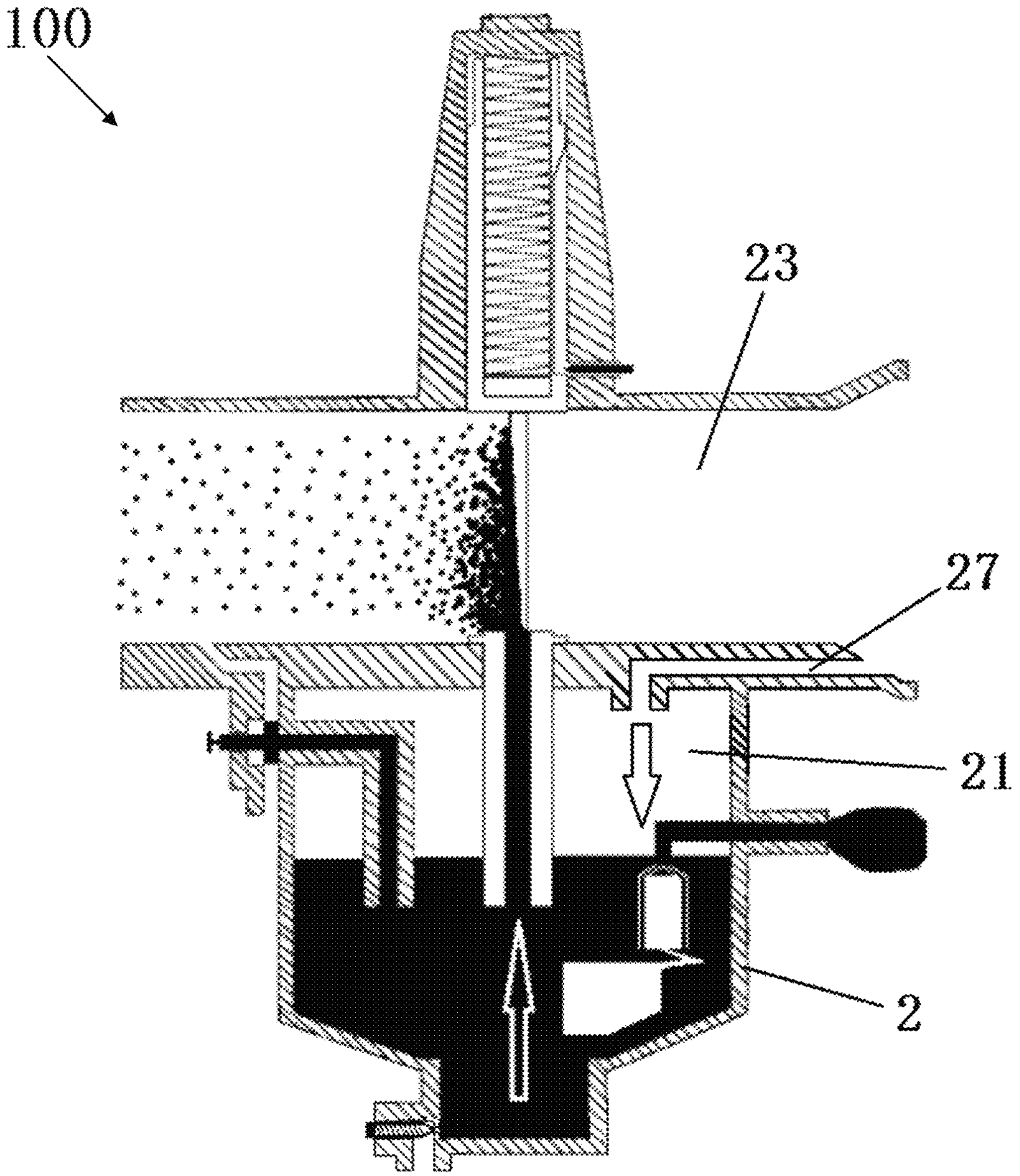
FIG. 17 is a schematic structural diagram of the carburetor according to yet another embodiment of the present disclosure.

Referring to FIG. 17, the main body 2 of the embodiment shown in FIG. 17 is provided with an air pressure channel 27, and the air pressure channel 27 is arranged adjacent to the air flow channel 23. When the air flow passes through the airflow channel 23, a part of the air will crash into the air pressure channel 27 and enter the float chamber 21, and an air pressure in the float chamber 21 will gradually increase. When the air pressure in the float chamber 21 increases to a certain extent, the air pressure drives the fuel in the float chamber 21 to flow to the airflow channel 23 through the fuel outlet channel 22. At the same time, during the flow of the air flow in the airflow channel 23, according to Bernoulli's law, one negative pressure will be generated inside the air flow, and another negative pressure will be formed in the fuel outlet channel 22. Under the double action of negative pressure and positive pressure, the fuel outlet channel 22 enables the fuel in the float chamber 21 to flow to the airflow channel 23 with a faster flow speed and more flow amount. Air flow and more fuel into the combustion chamber provide more power to the engine.

The air pressure channel 27 includes two channels that are perpendicular to each other, so that the air flow can flow into the float chamber 21 more smoothly when entering the air pressure channel 27. In addition, the air pressure channel 27 of the present embodiment is closer to the airflow channel 23, so that the air flow flowing into the air pressure channel 27 per unit time increases, which can quickly form a larger air pressure on the float chamber 21 and drive the fuel into the fuel outlet channel 22, and then enter the airflow channel 23 through the fuel outlet channel 22. Certainly, in other embodiments, the two channels of the air pressure channel 27 perpendicular to each other can also be arranged at other angles, which is not limited herein.

Figure 18:
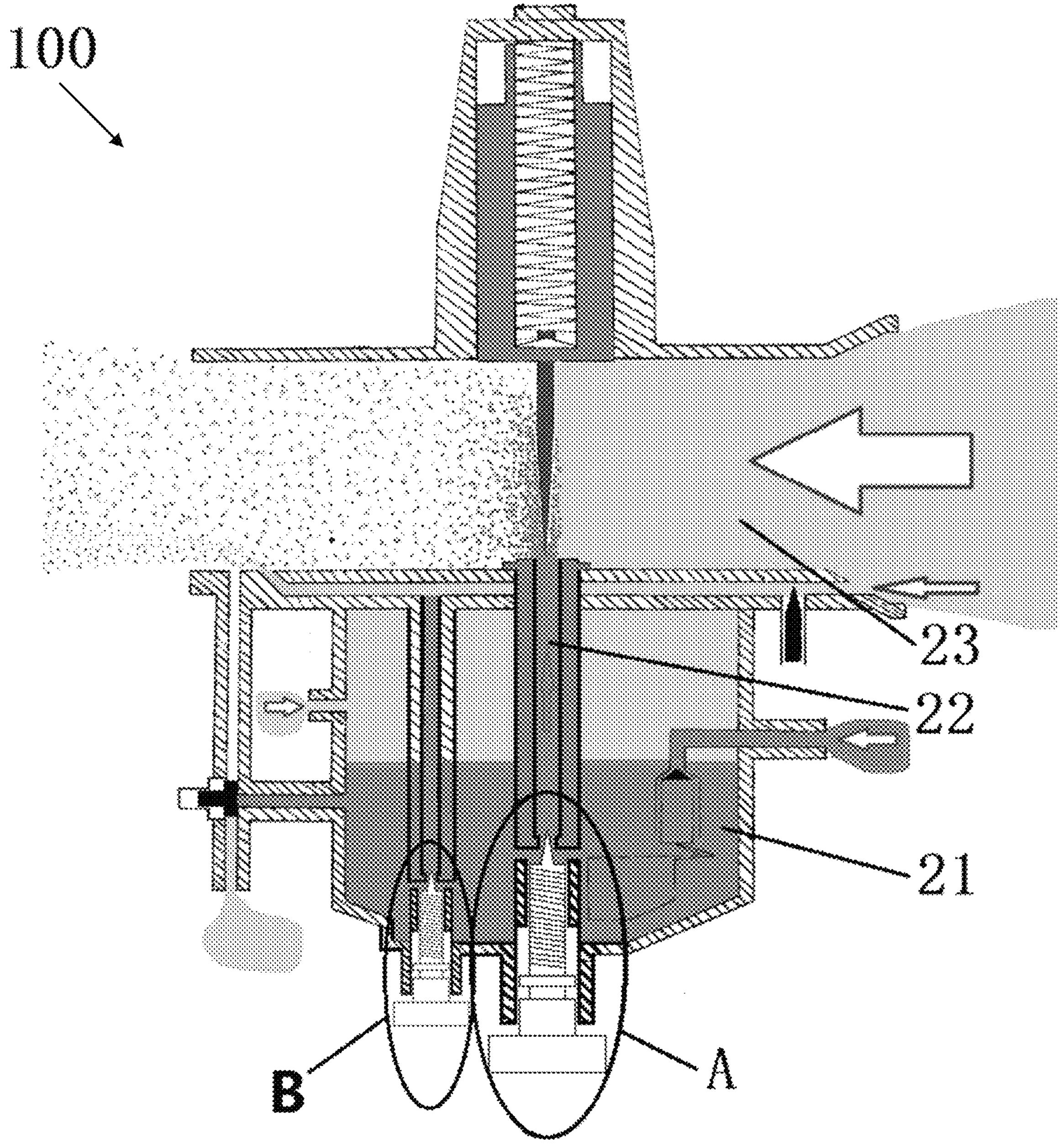
FIG. 18 is a schematic structural diagram of the carburetor according to yet another embodiment of the present disclosure.

Referring to FIG. 18, in order to make the adjustment of the fuel outlet of the carburetor 100 more precise, a control member 7 can be disposed in the carburetor 100. The control member 7 is threadedly engaged to the main body 2 and can rotate relative to the main body 2 to adjust a circulation space between the fuel outlet channel 22 and the float chamber 21, thereby adjusting a maximum fuel outlet amount of the fuel outlet channel 22. When the circulation space is larger, under the same negative pressure, a maximum amount of fuel flowing into the fuel outlet channel 22 from the float chamber 21 per unit time increases, and the amount of fuel flowing into the airflow channel 23 accordingly increases. When the circulation space is smaller, under the same negative pressure, the maximum amount of fuel flowing into the fuel outlet channel 22 from the float chamber 21 per unit time decreases, and the amount of fuel flowing into the airflow channel 23 accordingly decreases.

A part of the main body 2 adjacent to the fuel outlet channel 22 is provided with a mounting channel 26, and the control member 7 is threadedly engaged to the mounting channel 26. One end of the control member 7 adjacent to the fuel outlet channel 22 is provided with a flow limiting portion 71, and another end of the control member 7 is provided with an insertion slot 72. The user can insert a screwdriver into the insertion slot 72, and drive the control member 7 to rotate through the screwdriver to make the flow limiting portion 71 move back and forth in the fuel outlet channel 22, so that the flow limiting portion 71 adjusts the circulation space between the fuel outlet channel 22 and the float chamber 21.

Figure 19:
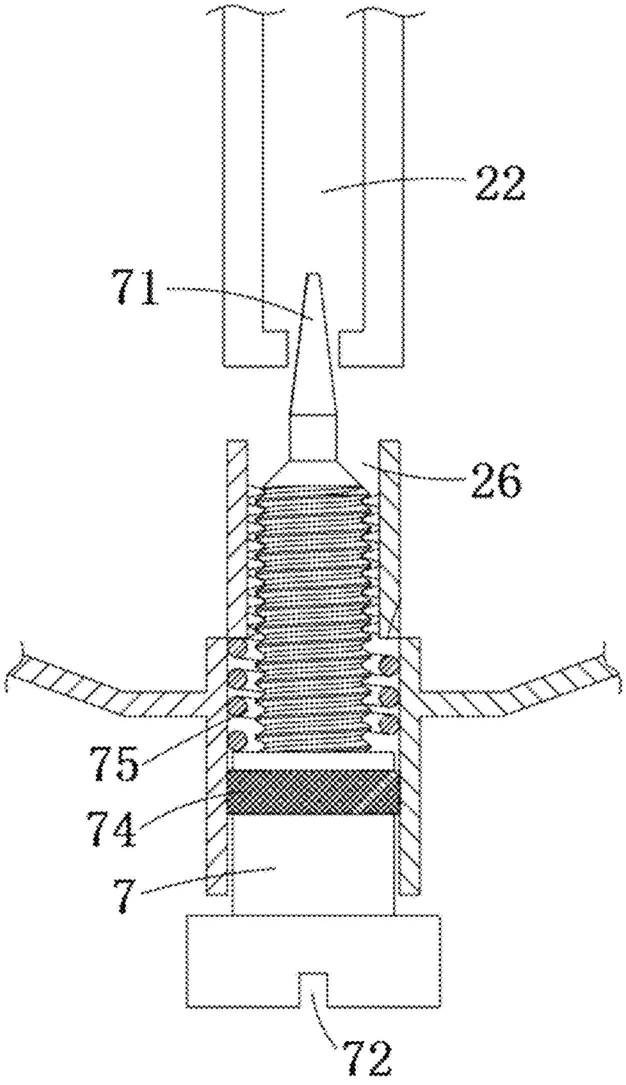
FIG. 19 is an enlarged diagram of part A or part B in FIG. 18.

The flow limiting portion 71 of the embodiment shown in FIG. 19 is in the shape of a cone. A longitudinal section of the flow limiting portion 71 is circular, and the longitudinal section is a plane perpendicular to a central axis of the flow limiting portion 71.

Figure 20:
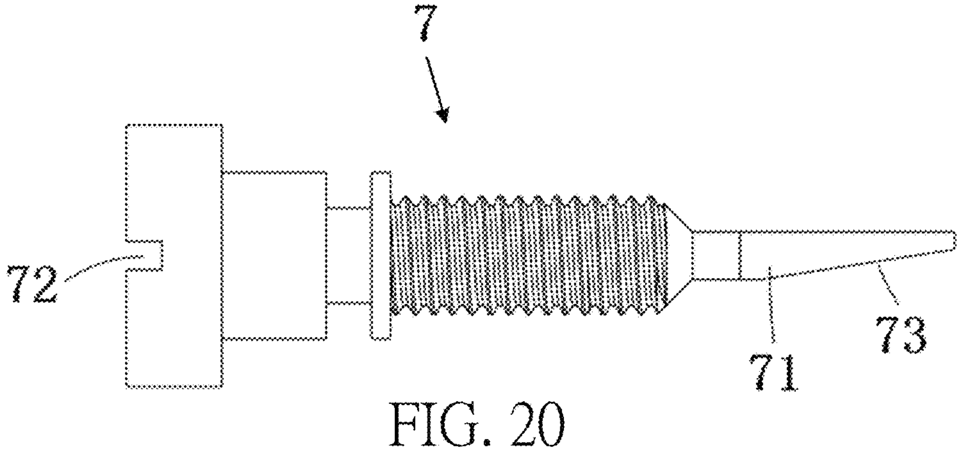
FIG. 20 is a schematic structural diagram of a control member according to an embodiment of the present disclosure.

Referring to FIG. 20, in other embodiments, the flow limiting portion 71 may also be a cylinder with an oblique notch 73, which is not limited herein. When the flow limiting portion 71 moves toward the fuel outlet channel 22, the flow limiting portion 71 gradually blocks the fuel outlet channel 22, and the fuel outlet space of the fuel outlet channel 22 becomes smaller. When the flow limiting portion 71 moves away from the fuel outlet channel 22, the flow limiting portion 71 gradually unblocks the fuel outlet channel 22, and the fuel outlet space of the fuel outlet channel 22 becomes larger. Such an adjustment method can completely replace the adjustment of the main metering hole and the auxiliary metering hole of the traditional carburetor. Usually, when people adjust the main metering hole and the auxiliary metering hole of the traditional carburetor, they must remove the carburetor's float chamber for the replacement of the screws of the main metering hole and the auxiliary metering hole. The replacement is time-consuming and labor-intensive. The improved adjustment method does not need to disassemble the float chamber, and can directly adjust the fuel outlet more accurately without any tools.

Referring to FIG. 19, a sealing ring 74 and a return spring 75 are sleeved on the control member 7. The sealing ring 74 is made of rubber or silicone material, and an outer wall of the sealing ring 74 abuts against an inner wall of the mounting channel 26, so that the control member 7 is not easy to be separated from the mounting channel 26, and a function of isolating air, liquid and dust is therefore provided. In addition, the sealing ring 74 can also prevent the fuel from the float chamber 21 from leaking out.

The return spring 75 is always in a compressed state, so that the return spring 75 can always apply another elastic force to the control member 7 to drive the control member 7 to be in a tensioned state. In a natural state, the control member 7 is not easy to accidentally rotate to misadjust the fuel outlet space of the fuel outlet channel 22, which improves the safety of use.

Referring to FIG. 21 to FIG. 28, in other embodiments, those can be used as the control device of part B in FIG. 18. The control member 7 includes a first adjustment member 76, a second adjustment member 77 and a third adjustment member 78. The first adjustment member 76 has a first end portion and the second end portion that are opposite to each other. The first end portion is provided with the flow limiting portion 71, and the second end portion is detachably connected to the third adjustment member 78. An outer surface of the second adjustment member 77 is provided with a first external thread 771. The second adjustment member 77 has a through hole 772, and the through hole 772 correspondingly and spatially communicates with two ends of the second adjustment member 77 that are opposite to each other. The third adjustment member 78 has a third end portion and a fourth end portion that are opposite to each other. The third end portion and an end of the second adjustment member 77 adjacent to the third adjustment member 78 are connected to each other through a mortise and tenon structure, and a first return member 762 is sleeved on the first adjustment member 76.

The control member 7 can be used to adjust a fuel outlet rate of the carburetor 100. Specifically, the mortise and tenon structure includes a tenon 781 and a mortise 783, and there are one or more mortises 781 and mortises 783 that match each other. In the present embodiment, there are two mortises 781 and mortise grooves 783. When in use, the user can pull the third adjustment member 78 outward, and the third adjustment member 78 drives the first adjustment member 76 to move outward, thereby making the flow limiting portion 71 move outwards. At this time, the tenon 781 escapes from the mortise 783, and then the third adjustment member 78 is rotated to displace the tenon 781 and the mortise 783. At this time, the first return member 762 correspondingly acts on the flow limiting portion 71 and the second adjustment member 77 to push the flow limiting portion 71 and the second adjustment member 77 toward a direction away from each other, so that the tenon 781 is pressed against the end of the second adjustment member 77 adjacent to the third adjustment member 78, so as to ensure that the fuel outlet rate of the carburetor 100 will not be too high. When it is necessary to return the control member 7, the third adjustment member 78 is rotated so that the tenon 781 faces the mortise 783, and since the first return member 762 acts on the flow limiting portion 71 and the second adjustment member 77, the tenon 781 is inserted inside the mortise 783, and the longitudinal cross-sectional area of the flow limiting portion 71 decreases gradually, so the flow limiting portion 71 can adjust the fuel outlet area of the carburetor 100 during its activity. This method can facilitate the user to return the control member 7 to the original position, which ensures that the fuel outlet rate of the carburetor 100 can be quickly restored, and is convenient to use and saving time and effort. This design can also completely replace the choke valve design of the traditional carburetor and achieve more accurate fuel enrichment, and it is not easy to wet a spark plug during cold start and is very easy to cold start.

Figure 21:
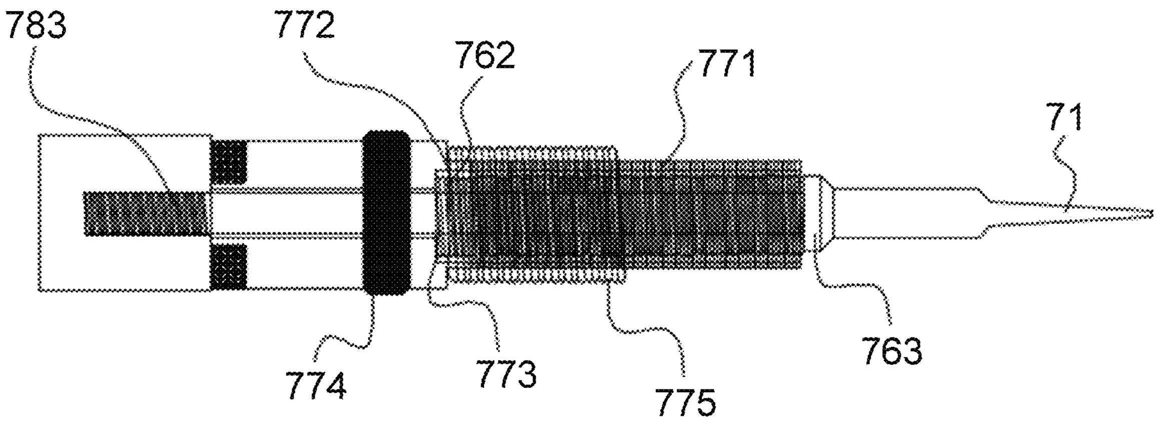
FIG. 21 is a schematic overall cross-sectional diagram of the control member according to the embodiment of the present disclosure.
Figure 22:
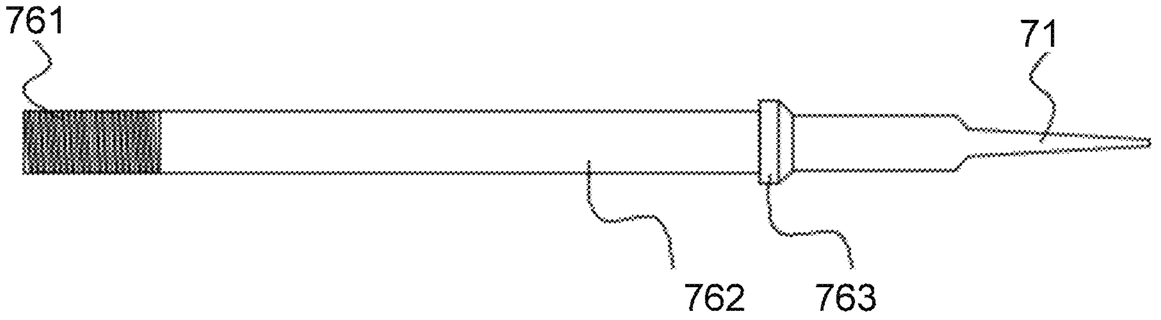
FIG. 22 is a schematic cross-sectional diagram of a first adjustment member of the control member of the present disclosure.

As shown in FIG. 21 or FIG. 22, the flow limiting portion 71 is conical, and the longitudinal section of the flow limiting portion 71 is circular. The flow limiting portion 71 can adjust the fuel outlet area of the carburetor 100, and in a direction from the second end portion to the first end portion, the longitudinal section area of the flow limiting portion 71 decreases. Specifically, the longitudinal section is a plane perpendicular to the central axis of the flow limiting portion 71.

Figure 23:
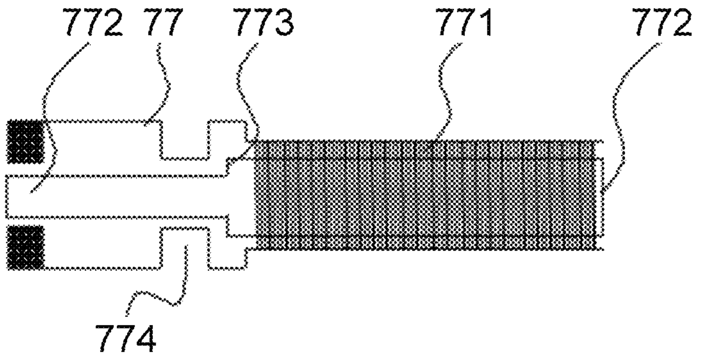
FIG. 23 is a schematic cross-sectional diagram of a second adjustment member of the control member of the present disclosure.
Figure 24:
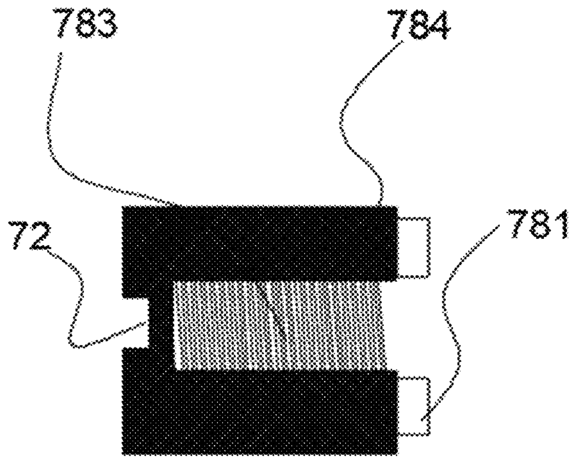
FIG. 24 is a schematic cross-sectional diagram of a third adjustment member of the control member of the present disclosure.
Figure 25:
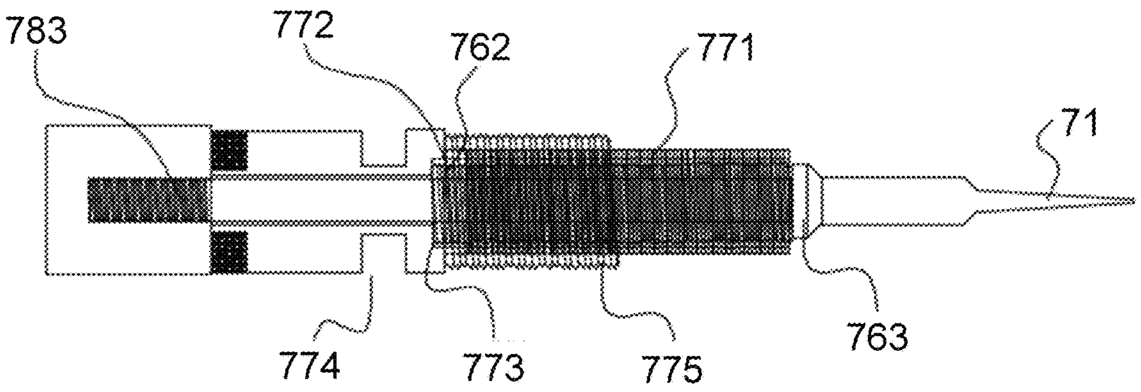
FIG. 25 is another schematic overall cross-sectional diagram of the control member of the present disclosure.
Figure 26:
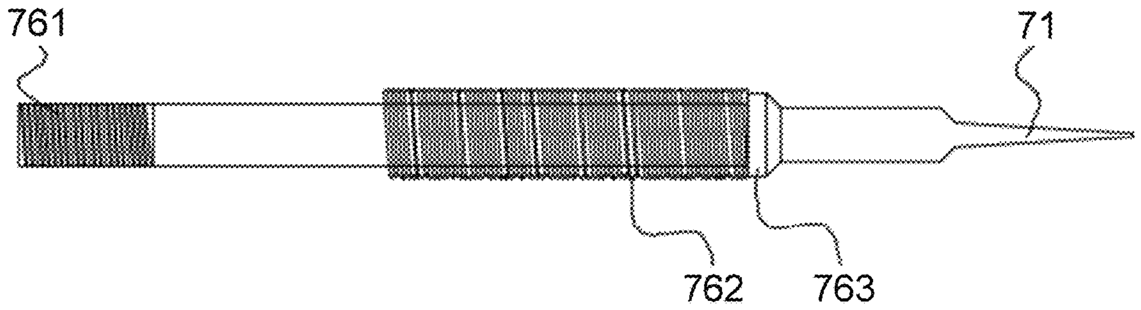
FIG. 26 is another schematic cross-sectional diagram of the control member of the present disclosure.
Figure 27:
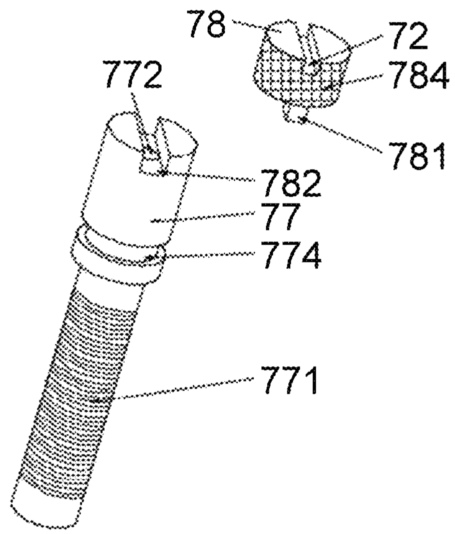
FIG. 27 is a schematic structural diagram of the second adjustment member and the third adjustment member of the control member of the present disclosure.
Figure 28:
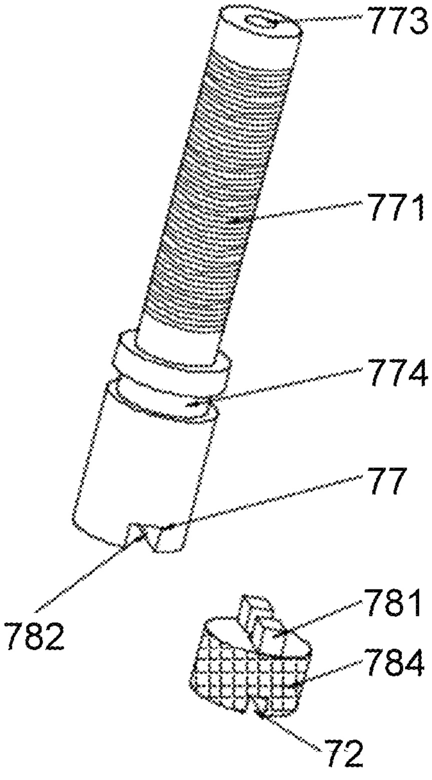
FIG. 28 is another schematic structural diagram of the second adjustment member and the third adjustment member of the control member of the present disclosure.

As shown in FIG. 21 to FIG. 23, a tail end of the flow limiting portion 71 and an inner wall of the through hole 772 are respectively provided with a first mounting seat 763 and a second mounting seat 773, and two ends of the first return member 762 respectively act on the first mounting seat 763 and the second mounting seat 773. Further, the first return member 762 can be a spring, and two ends of the spring respectively act on the first mounting seat 763 and the second mounting seat 773. When there is no need to adjust the fuel outlet rate of the carburetor 100, since the spring is used to push the flow limiting portion 71 and the second adjustment member 77 toward a direction away from each other, the tenon 781 will be pressed against the mortise 783, which can increase the stability of the control member 7 and prevent the fuel outlet rate of the carburetor 100 from changing due to the deviation of the tenon 781 when the fuel outlet rate of the carburetor 100 does not need to be adjusted. In addition to the spring 103, the first return member 762 can also be replaced by two magnetic attractors. One magnetic attractor is disposed on the first mounting seat 763, and another magnetic attractor is disposed on the second mounting seat 773. When the first adjustment member 76 is moving, a distance between the two magnetic attractors approaches or moves away to accumulate a magnetic force or release the magnetic force, which can also achieve the same effect as a spring.

As shown in FIG. 21 to FIG. 25, the control member 7 further includes a sealing ring 74, and the second adjustment member 77 is provided with a mounting slot 774 along a circumferential direction. The sealing ring 74 is sleeved on the second adjustment member 77 and arranged in the mounting slot 774. Specifically, the sealing ring 74 is made of rubber or silica gel material, and the outer wall of the sealing ring 74 abuts against the inner wall of the mounting channel 26 of the carburetor 100, so that the control member 7 is not easy to be separated from the carburetor 100 and plays a role of sealing air.

As shown in FIG. 21 to FIG. 25, the control member 7 further includes a second return member 775 sleeved on the outer surface of the second adjustment member 77.

As shown in FIG. 21 to FIG. 25, the outer surface of the second end portion is provided with a second external thread

761, and the third end portion is provided with a third threaded hole 783 matching the second external thread 761.

Further, the second external thread 761 can be threadedly engaged to the third threaded hole 783, so that the second end portion and the third end portion can be detachably connected to each other.

As shown in FIG. 21 to FIG. 25, the fourth end portion is provided with an insertion slot 72, which can be fittingly engaged to an external tool, so that the external tool can drive the adjustment member to rotate. The user can use the screwdriver to engage with the insertion slot 72, and rotate the screwdriver to make the third adjustment member 78 rotate. The third adjustment member 78 drives the second adjustment member 77 to rotate through a cooperation of the tenon 781 and the mortise 783, and the second end portion of the first adjustment member 76 is detachably connected to the third adjustment member 78. Therefore, when the third adjustment member 78 rotates, the first adjustment member 76 is driven to rotate simultaneously, so as to control the movement of the flow limiting portion 71 to the carburetor 100, and the fuel outlet rate of the carburetor 100 is adjusted.

As shown in FIG. 21 to FIG. 28, an outer surface of the third adjustment member 78 is provided with anti-slip patterns 784. Further, the user can also manually operate the control member 7. Specifically, the user can use fingers to pinch the third adjustment member 78 to drive the entire control member 7 to rotate, or use the hands to pull the third adjustment member 78 outward, and then rotate the third adjustment member 78. The existence of the anti-slip patterns 784 can prevent the user from slipping when operating the control member 7 by using the hands.

In the field of internal combustion engine technology, it is well known that the power output provided by the carburetor often exceeds that of the electronic injection system. Since there are a large number of complex sensors in the electronic fuel injection system, the sensors will transmit the collected signals to the central controller ECU, and the ECU will control the fuel injection system to inject fuel to do work for the engine after calculation. The whole process will take a certain amount of time. The carburetor completely follows the laws of physics, and will provide accurate fuel to the engine at the moment of opening the throttle. Due to the fine fuel atomization effect, the engine can respond immediately and completely release the power. Compared with the traditional closed carburetor, all the adjustable mechanisms of the carburetor of the present disclosure are exposed, and can be adjusted without any tools, which is very convenient. In addition, the carburetor of the present disclosure is a mechanical fuel system, so it is more stable and reliable than the electric fuel injection system in harsh environments.

The above is only used to illustrate the technical solution of the present disclosure and not limit it. Other modifications or equivalent replacements made by those skilled in the art to the technical solution of the present disclosure, and as long as they do not depart from the spirit and scope of the technical solutions of the present disclosure, they all should be included in the claims of the present disclosure.

What is claimed is:

1. An adjustment structure, comprising:

a throttle valve provided with an accommodating cavity and a sliding rail arranged in the accommodating cavity;

a movable member arranged in the accommodating cavity, wherein the movable member is slidably connected to the sliding rail; and a rotating member arranged in the accommodating cavity, wherein the rotating member is threadedly engaged to the movable member and rotates relative to the movable member, and the movable member is configured to be driven to slide back and forth along the sliding rail through screw threads, so as to adjust a height of a jet needle connected to the movable member;

wherein a cavity wall of the accommodating cavity is provided with at least one sliding slot, the at least one sliding slot defines the sliding rail; the movable member includes at least one engaging flange, each of the at least one engaging flange is fittingly engaged to a corresponding one of the at least one sliding slot, so as to enable the movable member to slide back and forth along the sliding rail.

2. The adjustment structure according to claim 1, further comprising a return member, wherein the return member is correspondingly connected to the throttle valve and the movable member; wherein, when the rotating member rotates relative to the movable member to drive the movable member adjacent to the return member, a return force is accumulated in the return member, and the return member releases the return force to press against the movable member, so that the movable member drives the rotating member to be positioned at a top of the accommodating cavity.

3. The adjustment structure according to claim 2, wherein a circumferential side wall of the rotating member is provided with a plurality of limiting slots, the adjustment structure further comprises a limiting screw, and the limiting screw is engaged to any of the plurality of limiting slots, so as to limit a rotation of the rotating member relative to the movable member.

4. A carburetor, comprising a main body, a jet needle and the adjustment structure as claimed in claim 1, wherein the main body is provided with a float chamber, a fuel outlet channel and an airflow channel; the fuel outlet channel correspondingly and spatially communicates with the float chamber and the airflow channel, one end of the jet needle is connected to the movable member, another end of the jet needle is inserted into the fuel outlet channel, and the rotating member rotates relative to the movable member to drive the jet needle to slide relative to the fuel outlet channel so as to adjust a fuel outlet space of the fuel outlet channel.

5. The carburetor according to claim 4, wherein the adjustment structure further comprises a return member, and the return member is correspondingly connected to the throttle valve and the movable member; wherein, when the rotating member rotates relative to the movable member to drive the movable member adjacent to the return member, a return force is accumulated in the return member, and the return member releases the return force to press against the movable member, so that the movable member drives the rotating member to be positioned at a top of the accommodating cavity.

6. The carburetor according to claim 5, wherein a circumferential side wall of the rotating member is provided with a plurality of limiting slots, the adjustment structure further includes a limiting screw, and the limiting screw is engaged to any of the plurality of limiting slots, so as to limit a rotation of the rotating member relative to the movable member.

7. The carburetor according to claim 4, further comprising an adjustment assembly, wherein the adjustment assembly includes a cover plate and an adjustment member, the adjustment member is rotatably connected to the cover plate, the cover plate is connected to the main body, the adjustment member is fittingly engaged to the rotating member, so that, when the adjustment member rotates relative to the cover plate, the adjustment member drives the rotating member to rotate relative to the movable member, so as to adjust a height of the jet needle.

8. The carburetor according to claim 7, wherein the adjustment assembly further includes an elastic member, the elastic member is correspondingly connected to the cover plate and the adjustment member, the adjustment member slides relative to the cover plate to be fittingly engaged to the rotating member while driving the elastic member to enable an elastic force to be accumulated, and the elastic member releases the elastic force to drive the adjustment member to be disengaged from the rotating member.

9. The carburetor according to claim 4, wherein the throttle valve is slidably connected to the main body and provided with a first guiding surface, the first guiding surface and an axial direction of an air intake channel have an included angle therebetween, a radial dimension of the first guiding surface decreases gradually in an air intake direction of the air intake channel, and the throttle valve slides relative to the main body, so as to adjust a windward area of the first guiding surface at the air intake channel.

10. The carburetor according to claim 4, further comprising an extension tube and a packaging assembly, wherein one end of the extension tube is connected to the main body and the extension tube spatially communicates with the float chamber, another end of the extension tube is connected to the packaging assembly, and the packaging assembly is switched between a closed state and an open state; wherein, when the packaging assembly is in the closed state, a fuel in the float chamber is not able to flow to outside, and when the packaging assembly is in the open state, the fuel in the float chamber flows to outside through the extension tube and the packaging assembly.

11. The carburetor according to claim 4, further comprising a control member, wherein the control member is threadedly engaged to the main body and rotates relative to the main body to adjust a circulation space between the fuel outlet channel and the float chamber.

12. The carburetor according to claim 11, wherein one end of the control member adjacent to the fuel outlet channel is provided with a flow limiting portion and another end of the control member is provided with an insertion slot; an external tool is configured to be inserted into the insertion slot by a user to drive the control member to rotate so that the flow limiting portion moves back and forth in the fuel outlet channel, so as to adjust a circulation space between the fuel outlet channel and the float chamber.

13. The carburetor according to claim 11, wherein the flow limiting portion is conical, a longitudinal section of the flow limiting portion is circular, and the longitudinal section is a plane perpendicular to a central axis of the flow limiting portion.

14. The carburetor according to claim 11, wherein the flow limiting portion is a cylinder with an oblique notch.

15. The carburetor according to claim 11, wherein a part of the main body adjacent to the fuel outlet channel is provided with a mounting channel, the control member is threadedly engaged to the mounting channel and sleeved with a sealing ring, and an outer wall of the sealing ring abuts against an inner wall of the mounting channel, so that the control member is not easily disengaged from the mounting channel.

16. The carburetor according to claim 12, wherein the control member includes a first adjustment member, a second adjustment member, and a third adjustment member; the first adjustment member includes a first end portion and a second end portion that are opposite to each other, the first end portion is provided with the flow limiting portion, and the second end portion is detachably connected to the third adjustment member; wherein an outer surface of the second adjustment member is provided with a first external thread, the second adjustment member has a through hole, and the through hole correspondingly and spatially communicates with two ends of the second adjustment member that are opposite to each other; wherein the third adjustment member has a third end portion and a fourth end portion that are opposite to each other, the third end portion is connected to an end of the second adjustment member adjacent to the third adjustment member through a mortise and tenon structure, and a first return member is sleeved on the first adjustment member.

17. The carburetor according to claim 16, wherein a first mounting seat and a second mounting seat are respectively provided on a tail end of the flow limiting portion and an inner wall of the through hole, and two ends of the first return member respectively act on the first mounting seat and the second mounting seat.

18. The carburetor according to claim 16, wherein the control member further includes a second return member sleeved on an outer surface of the second adjustment member.

* * * * *